UNITED STATES PATENT OFFICE.

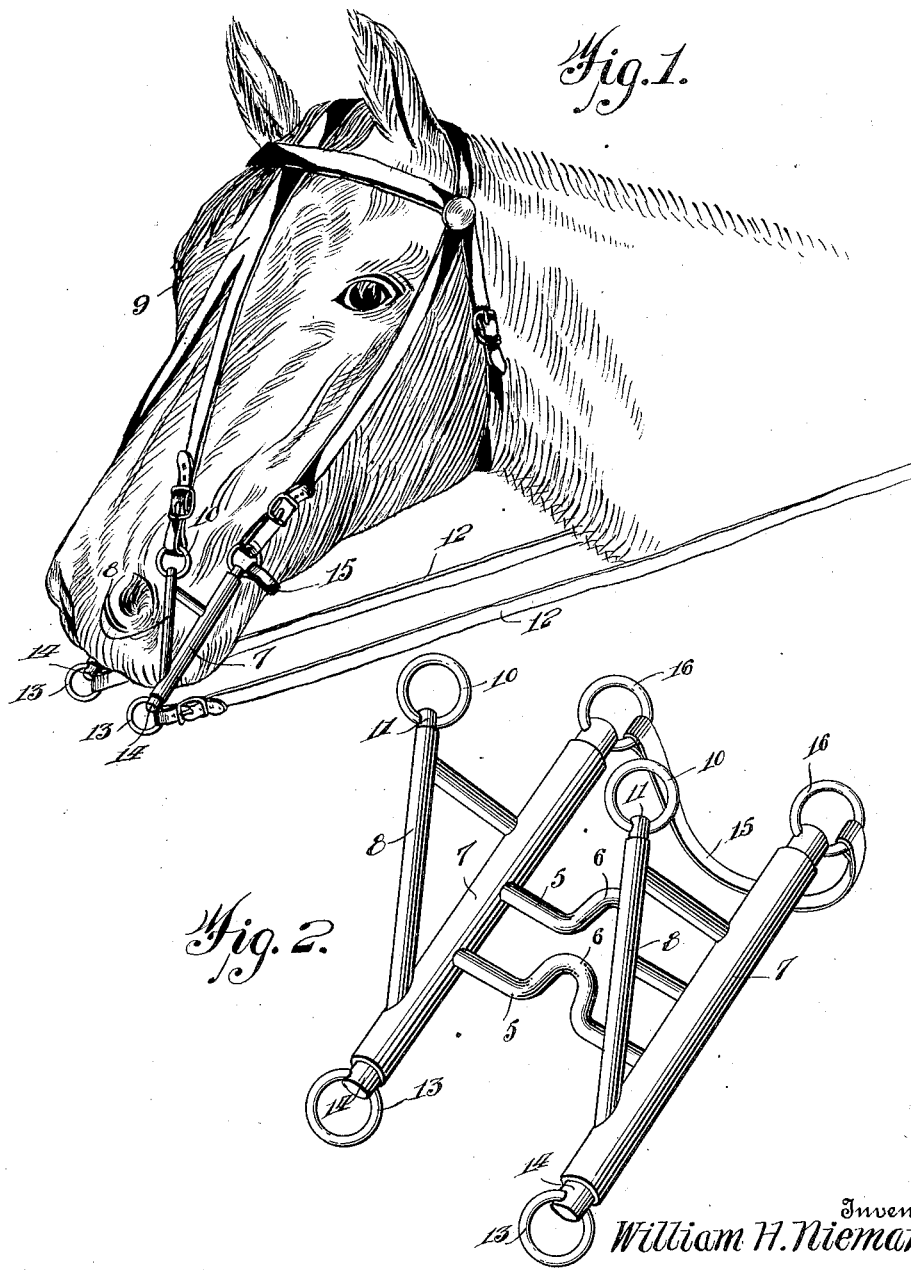

WILLIAM H. NIEMANN, OF LITCHFIELD, ILLINOIS.

BRIDLE-BIT.

1,076,442.  Specification of Letters Patent.  Patented Oct. 21, 1913.

Application filed February 13, 1912. Serial No. 677,283.

*To all whom it may concern:*

Be it known that I, WILLIAM H. NIEMANN, a citizen of the United States, residing at Litchfield, in the county of Montgomery and State of Illinois, have invented new and useful Improvements in Bridle-Bits, of which the following is a specification.

The general object of the invention is to provide a bridle bit which is constructed so as to coöperate with the portion of the harness to which it is connected, to prevent the animal from lowering his head beyond a desired position; and to this end the invention consists in certain improved constructions, arrangements, and combinations of devices, which will be fully described hereinafter, and then pointed out in the claim.

Other objects will appear and be better understood from that embodiment of my invention of which the following is a specification, reference being had to the accompanying drawings forming a part thereof, in which;

Figure 1 is a side elevation of the device in applied position. Fig. 2 is a detail perspective thereof.

The bit bars 5—5 are suitably shaped such as by curving their middle portions 6—6, so as to prevent their turning in the animal's mouth and to bind on the roof of the mouth under a pull on the reins. The cheek frames 7—7 which extend longitudinally of the animal's mouth and to which the bit bars 5—5 are suitably secured, may be of any preferred construction and formed of any suitable material, such as metal, the same being preferably formed from straight elongated bars in order to render the construction thereof extremely simple. In addition to connecting the bit bars 5—5 the cheek frames 7—7 also form supports for the angular-shaped brackets 8—8 which are also constructed from straight bars and formed with or otherwise suitably connected to the cheek frames so as to extend forwardly when the bit is positioned as shown in Fig. 1.

The diverging ends of the check reins 9 are connected to eyes or rings 10—10 which are loose in sleeves 11—11 at the upper forward ends of the brackets 8—8. By so disposing the brackets 8—8 and connecting the check rein thereto, an extremely efficient means is provided for preventing the animal from lowering his head, since an attempt to do so will cause the curved portions 6—6 to bind on the interior of the mouth and thereby pain the animal until he restores his head to the desired position.

The driving reins 12—12 are connected to the eyes or rings 13—13 in the sleeves 14—14 at the lower ends of the cheek frames 7—7. An ordinary pull on either of the reins 12—12 will not rock the bit to any appreciable extent, but just sufficient to indicate to the animal the direction in which it is desired that he proceed. But when a relatively strong pull is placed upon both reins 12—12 the bit as a whole will turn, thus causing the upper end portions of the cheek frames to move outwardly and forwardly. This will have the effect of causing the choke strap 15 which is connected to the rings 16—16 at the upper ends of the cheek frames 7—7, to so bind upon the animal's neck as to interrupt his breathing and cause him to stop abruptly.

Although I have shown and described one embodiment of my invention it is to be understood that I am not to be limited to the specific arrangement and construction of parts since various changes may be made, within the scope of the appended claim without departing from the spirit or sacrificing any of the advantages of the invention.

What I claim as new is:

A bit including cheek frames comprising straight bars of approximately uniform diameter throughout, ring connections provided at the forward ends of said bars, choke strap connections provided at the rear ends of said bars, bit bars transversely connecting said bars and check rein bars comprising straight lengths of material connected at their forward ends to the cheek bars immediately adjacent the rein connections of said bit bars, said check rein bars extending upwardly and rearwardly at an angle to the cheek bars and terminating in rear of the bit bars, and check rein connections carried beyond the rear terminals of the check rein bars.

In testimony whereof I affix my signature in presence of two witnesses.

WILLIAM H. NIEMANN.

Witnesses:
 WILLIAM HIEROYMUS,
 H. C. HIERONYMUS.

---

Copies of this patent may be obtained for five cents each, by addressing the "Commissioner of Patents, Washington, D. C."